United States Patent [19]

Hanotier et al.

[11] 3,852,343

[45] Dec. 3, 1974

[54] A PROCESS FOR THE PRODUCTION OF BENZENE CARBOXYLIC ACIDS FROM ETHYL SUBSTITUTED BENZENS

[75] Inventors: Jacques D. V. Hanotier; Pierre M. J. G. DeRadzitzky D'Ostrowick, both of Brussels, Belgium

[73] Assignee: Labofina S.A., Brussels, Belgium

[22] Filed: June 26, 1973

[21] Appl. No.: 374,792

Related U.S. Application Data

[63] Continuation of Ser. No. 129,250, March 29, 1971, abandoned.

[52] U.S. Cl. ... 260/524 R, 260/488 CD, 260/523 A
[51] Int. Cl. ............................................ C07c 63/02
[58] Field of Search .................... 260/524 R, 523 R

[56] References Cited
UNITED STATES PATENTS

| | | | |
|---|---|---|---|
| 2,833,816 | 5/1958 | Saffer et al..................... | 260/524 R |
| 2,833,817 | 5/1958 | Saffer............................. | 260/524 R |
| 3,036,122 | 5/1962 | Ardis et al. .................... | 260/524 R |

*Primary Examiner*—Lorraine A. Weinberger
*Assistant Examiner*—Richard D. Kelly

[57] ABSTRACT

A process for oxidizing ethyl-substituted benzenes to benzene carboxylic acids in a solvent mixture consisting of acetic acid and water using a cobalt carboxylate and manganese carboxylate catalyst and maintaining the concentration of unreacted ethyl-substituted benzene in reaction mixture at a value of at least 5 percent by volume on a solvent-free basis.

7 Claims, No Drawings

PROCESS FOR THE PRODUCTION OF BENZENE CARBOXYLIC ACIDS FROM ETHYL-SUBSTITUTED BENZENES

This is a continuation, of application Ser. No. 129,250, filed Mar. 29, 1971, now abandoned.

This invention relates to a process for the preparation of benzene carboxylic acids by catalytic liquid-phase oxidation of ethyl-substituted benzene compounds.

During the last two decades, the commercial importance of benzene carboxylic acids has continuously increased. For example, polyesters of terephthalic acid with ethylene glycol have proved to be especially useful in the manufacture of synthetic fibers. Isophthalic acid is more and more used in the manufacture of resinous products for which its superiority over phthalic anhydride has been demonstrated. Similarly, new uses are discovered for tricarboxylic acids such as trimesic acid. The interest in these applications has resulted in an increasing demand for a larger supply in these acids at decreasing costs and improved purity.

At the present time, the production of these aromatic acids is mainly limited by the availability of the starting materials and for this reason the technology of production is mainly based on the use of methylaromatic hydrocarbons as feedstocks. As a matter of fact, methylaromatics are produced in large amounts by conventional refining techniques such as catalytic reforming and methods have been developed to separate them in pure form. For example, p-xylene which is the starting material for the preparation of terephthalic acid can be separated from its meta isomer and purified by crystallization at low temperature. The resulting mother liquors consist in a mixture of m- and p-xylenes from which the former can only be isolated by elaborated and costly methods.

In addition to the limitations inherent to the methods available for their separation, methylaromatic hydrocarbons are relatively resistant to oxidation which explains that a considerable amount of work has been performed for discovering or improving methods for their oxidation into carboxylic acids. Processes were developed using nitric acid as oxidizing agent but, except in special cases, are now virtually abandoned as a result of corrosion and purification problems. Most of the existing processes are now based on the use of molecular oxygen as oxidizing agent and of heavy metals as catalysts, at elevated temperatures and pressures. However, even in such severe conditions it is often difficult to oxidize more than one methyl substituent in one step. For instance, it is well known that, although p-xylene can be transformed with relative ease into p-toluic acid, the oxidation of the methyl group of the latter is considerably more difficult and often requires intermediate esterification to be feasible. To overcome this difficulty, processes have been developed which are based on the use of bromine-containing catalysts or of activators such as ketones, aldehydes, peroxides, etc. Although some of these processes have been proved to be successful for producing aromatic acids from xylenes in one step, they are still subjected to serious drawbacks. For instance, in the processes where bromine-containing catalysts are used, elevated temperatures and pressures are generally required and severe corrosion problems arise as a result of the presence of bromine. In other processes, activator consumption and contamination of the reaction mixture by products from activator oxidation are serious limitations to commercial application.

As new fields were developed in the oil industry, other aromatic hydrocarbons were made available as starting materials for the preparation of aromatic carboxylic acids. For instance, an increasing demand for polystyrene has resulted in an increased production of styrene from ethylbenzene and, consequently, in an increased production of ethylbenzene by alkylation of benzene with ethylene. In this synthesis, mixed diethylbenzene isomers are formed as by-products from which the meta isomer can be readily separated by distillation. Pure m-diethylbenzene is thus made available in large supply and low cost as feedstock for oxidation into isophthalic acid.

However, although secondary alkyl substituents are inherently more oxidizable than methyl radicals, the application to ethyl-substituted benzene compounds of the methods developed for xylenes generally results in low yields in carboxylic acids since side reactions yielding by-products such as esters and tar materials simultaneously take place. For instance, the oxidation of diethylbenzenes by the bromine-based processes results in an excessive formation of tar arising probably from side-chain bromination followed by dehydrobromination and polymerization reactions. On the other hand, the methods of the prior art wherein no bromine is used require substantially anhydrous conditions in which the alcohol intermediates formed in the oxidation of ethyl groups are readily transformed into hardly-oxidizable esters which accumulate in the reaction mixture at the expense of acid formation.

The process of the present invention obviates these important deficiencies of the prior art methods.

The primary object of this invention is to provide a one-step process for the preparation of benzene carboxylic acids in high yield by oxidation of inexpensive and readily available ethyl-substituted benzene compounds. Another object of this invention is to provide a process for carrying out such oxidations in relatively mild conditions without addition of any activator. A still further object is to provide such a process in which the reaction medium is only moderately corrosive and provides excellent control of temperature. Still other objects and advantages of the invention will appear in the description and in the examples.

These objects are accomplished by reacting an ethyl-substituted benzene compound having the general formula

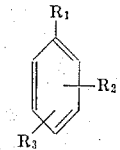

where $R_1$ is an ethyl radical, $R_2$ and $R_3$, which are the same or not, are each a member of the group comprising hydrogen and ethyl, acetyl, 1-hydroxyethyl, 1-acetoxyethyl and carboxyl radicals, said radicals being spaced from at least one unsubstituted nuclear carbon atom, with molecular oxygen at a temperature between 120° and 200°C in a solvent mixture consisting of acetic acid and water in a volume ratio comprised between 1 : 1 and 5 : 1, in the presence of a cobalt carboxylate in an amount of 0.010 to 0.100 mole per liter of reaction mixture and a manganese carboxylate in an amount of 0.001 to 0.010 mole per liter, said carboxylates being soluble in the reaction mixture, and maintaining in the reaction mixture the concentration of unreacted ethyl-substituted benzene at a value of at least 5% by volume on a solvent-free basis.

The aromatic compounds that can be oxidized by the process of the present invention comprise not only ethylbenzene, but also ethylbenzene further substituted by one or two radicals such as defined above. This definition includes m- and p-diethylbenzenes, 1.3.5.-triethylbenzene and intermediate oxygenated derivatives thereof, such as m- and p-ethylacetophenones, m- and p-(1-hydroxyethyl) acetophenones and esters thereof, m- and p-ethylbenzoic acids, and the like. For a sake of brevity, these compounds are referred to herein and in the appended claims as "ethyl-substituted benzene compounds."

Unexpectedly, when such ethyl-substituted benzene compounds are reacted with molecular oxygen in substantially anhydrous acetic acid, an important part of these compounds is transformed into acetic esters which are almost completely resistant to further oxidation and accumulate in the reaction mixture with the practical consequence that the yield in the desired carboxylic acid is inadequately low. This behavior contrasts with that of methyl-substituted compounds for which anhydrous conditions are generally required for optimum yield in the corresponding carboxylic acids. It has now been found, and this feature forms in part the basis of the present invention, that this ester formation can be prevented and the yield in carboxylic acids made almost quantitative by the conjoint presence of large amounts of water and of a cobalt salt in the reaction mixture. As those skilled in the art will appreciate, the action of water is likely to prevent the formation of esters and/or to favor hydrolysis thereof into more oxidizable alcohols. However, it is a surprising and unexpected fact that the presence of large amounts of water in the reaction mixture has a promoting effect on the yield in carboxylic acids only if a substantial amount of a cobalt salt is present at the same time.

In addition to this effect, we have found that the presence of water in the reaction medium is also essential for preventing deactivation of the catalysts. In strictly anhydrous conditions, formic acid produced in the oxidation of ethyl to carboxyl groups combines with the catalysts to form insoluble formates with the consequence that further oxidation is readily precluded. The use of large amounts of water completely prevents formate precipitation even when the catalysts are present in relatively high concentrations.

In order to secure the effects described hereabove, the amount of water in the reaction mixture should be at least 10 percent by volume. Although water contents as high as 50 percent or even higher may be used, it is preferred for technological reasons to use such an amount of water that the reaction mixture comprises only one liquid phase at the working temperature. Obviously, the concentration of water beyond which separation of an aqueous phase would occur depends on different factors, e.g., temperature, solvent to substrate ratio, acetic acid to water ratio and substrate conversion. In most cases, for 1 part of the compound to be oxidized, 1 to 10 parts by volume of a solvent comprising acetic acid and water in a volume ratio of 1 : 1 to 5 : 1 will be used with advantage.

As explained above, the presence of a relatively large amount of a cobalt salt is necessary for ensuring the above mentioned synergistic effect with water. In most cases, concentrations of from 0.010 to 0.100 mole per liter of reaction mixture will afford high yields in carboxylic acids, although concentrations outside this range may be used on certain occasions. Surprisingly, even in such relatively high concentrations, cobalt is not able to catalyze the oxidation of ethylsubstituted benzene compounds into benzene carboxylic acids if a manganese salt is not present in the reaction mixture. This important fact is an additional illustration of the difference between ethyl- and methyl-benzenes as in the prior art the latter are generally oxidized by using cobalt alone as catalyst. The amount of manganese salt to be used in the present process to ensure conversion of ethyl-substituted benzene compounds into benzene carboxylic acids may be varied from minute amounts to concentrations of 0.050 mole per liter of reaction mixture. However, we have discovered that in high concentration manganese may be an inhibitor for the reaction. We have also found that in the presence of large amounts of water, the manganese salts tend to be partly transformed into insoluble compounds, e.g., manganese dioxide, which contaminate the acids. For these reasons, a preferred range for the manganese salt concentration is from 0.001 to 0.010 mole per liter of reaction mixture.

Any cobalt and manganese salts soluble in the reaction mixture in the concentration ranges defined hereabove may be used as catalysts in the present process. Most carboxylic salts fulfill this condition and, as acetic acid is a major component of the reaction medium, cobalt and manganese acetates are particularly suitable. An important advantage of the present process as compared with many methods of the prior art is that the catalysts do not lose any activity even if used for extended periods of time. After product recovery, the catalysts can thus be recycled for re-use without resorting to any treatment or regeneration procedure.

The oxidation reaction herein defined is effected by contacting the reaction mixture with a gas containing molecular oxygen, e.g., air, at a pressure at least sufficient for maintaining a liquid phase at the working temperature. It is preferred to use pressures above this lower limit in order to maintain a partial pressure of oxygen allowing efficient oxygenation of the system. We have observed, indeed, that low partial pressures of oxygen favor side-reactions and formation of tar materials which results in poor quality and color of the carboxylic acid product. On the other hand, the use of high pressures increases investment costs without ever resulting in a substantial improvement. Moreover, high pressures of oxygen may also cause overoxidation and increase explosion hazards. Generally, partial pressures of oxygen of from 0.1 to 10 atmospheres will be used with advantage. A still preferred range is from 0.2 to 2 atmospheres.

In carrying out the process of the present invention, the ethyl-substituted benzene compound is mixed with the acetic acid-water solvent, the catalysts are added and the resulting mixture is heated while an oxygen-containing gas is passed through. Efficient stirring is provided for ensuring intimate contact between the gaseous and the liquid phase. Active oxidation soon takes place in the system as attested by an intense oxygen absorption and by a rapid increase of temperature.

To control temperature, any cooling device may be used, e.g., an immersed cooling coil. However, the presence of large amounts of water in the reaction mixture provides a convenient means for removing heat of reaction by vaporizing the solvent, this operation being easily controlled by varying the gas flow rate through the reactor. The mixture of water and acetic acid thus vaporized is then condensed and recycled into the reaction zone. Before recycling, this condensate or a part of it may be treated for removing the water of reaction.

As the reaction proceeds, i.e., as more substrate is converted into benzene carboxylic acid, the oxygen absorption decreases and would even cease before complete conversion is reached if additional ethylsubstituted compound was not added to the system. Indeed, it is an important aspect of the present invention that active oxidation and high yields in benzene carboxylic acids can only be obtained by maintaining in the reaction mixture a concentration of unreacted substrate corresponding to at least 5 percent of the amount initially charged. Accordingly, in the practice of the invention, fresh substrate should be added to the reaction mixture where active oxidation is taking place, at such a rate as to maintain its concentration at or above that critical value. This addition may be made continuously or intermittently. For instance, the reaction may be performed strictly in batch until e.g., 95 percent of the starting material has been oxidized; the reaction mixture is then cooled, the carboxylic acid product is separated by filtration or contrifugation, the filtrate is recycled into the reactor together with fresh substrate, and another oxidation run is performed in the same conditions. Another method comprises starting the reaction with only a part of the material to be oxidized and adding progressively the remainder, e.g., by continuous pumping, at a sufficient rate for maintaining active oxidation, then filtering the product, recycling the filtrate, and performing another oxidation run while pumping an additional charge of substrate. A still preferred method is to perform the reaction in flow, by pumping continuously fresh substrate into the reactor, recovering continuously the product and recycling the filtrate into the reaction zone. In this case, the residence time should be so selected as to maintain in the reaction mixture a steady concentration of unreacted substrate of at least 5 percent by volume on a solvent-free basis.

By carrying out the process of the present invention according to any of the particular procedures described hereabove, the overall yield in benzene carboxylic acids regularly exceeds 90 mole percent and may often be regarded as practically quantitative. Moreover, even for prolonged periods of reaction, neither by-product formation nor catalyst consumption can be noticed.

The invention will now be described with reference to the following examples which have to be considered as illustrative only.

EXAMPLE I

Into a corrosion-resistant autoclave equipped with a mechanical agitating device, a heating jacket, a cooling coil, a gas inlet tube, a vent connected to a condenser and a separatory device for the recovery and recycling of condensed materials, there was charged:

| | |
|---|---|
| m-diethylbenzene 99%: | 3 parts by volume |
| water: | 2 parts |
| acetic acid: | 5 parts |
| cobaltous acetate to a final concentration of | 0.050 mole per liter |
| manganous acetate to a final concentration of | 0.005 mole per liter |

This mixture was heated while stirring and admitting air through the reactor at a flow rate of 1,600 volumes (measured at 20°C and atmospheric pressure) per volume of reaction mixture per hour, the pressure in the autoclave being maintained at about 20 atmospheres. Oxygen absorption started as the temperature reached about 140°C. Temperature then rapidly climbed up to 160°C at which value it was maintained by controlled circulation of ethylene glycol through the cooling coil. The oxygen absorption rate increased sharply for the first 15 minutes of reaction and then decreased progressively. After 80 minutes, the reaction mixture was cooled and the autoclave was opened. The precipitate present in the reaction mixture was separated by filtration, washed three times with about two parts of acetic acid per part of precipitate, then washed with water in similar amounts, and it was dried under vacuum at about 100°C. The resulting white solid had an acid number of 673, i.e., close to the 675 value for pure isophthalic acid, and its weight corresponded to a molar yield in isophthalic acid of 43 percent, based on the m-diethylbenzene charged.

Similar results were obtained by substituting cobalt and manganese propionates for the acetates.

EXAMPLE II

The operation of Example I was repeated except that anhydrous acetic acid was used as solvent. The yield in isophthalic acid was 33 percent instead of 43 percent as in the preceding example. This shows that, in the conditions of the invention, water has a promoting effect on the oxidation of m-diethylbenzene into isophthalic acid.

EXAMPLE III

The operation of Example I was repeated except that cobaltous acetate alone was used as catalyst. The oxygen absorption was more than twice lower than in Example I and no precipitate of isophthalic acid was present in the reaction mixture. This example demonstrates that the presence of a manganese catalyst is necessary for oxidizing m-diethylbenzene into isophthalic acid.

EXAMPLE IV m-Diethylbenzene was oxidized by following the procedure of Example I except that pure oxygen was used instead of air. The flow rate of oxygen was about 500 volumes per volume of reaction mixture per hour and the pressure in the autoclave was maintained to about 6 atmospheres. Moreover, the operation was continued up to a reaction time of 180 minutes. The molar yield in isophthalic acid was 53 percent, based on the m-diethylbenzene charged.

EXAMPLE V

The operation of Example IV was repeated except that anhydrous acetic acid was used as solvent. The yield in isophthalic acid was 42 percent, which confirms the promoting effect of water already illustrated by Example II.

EXAMPLE VI

The operation of Example V was repeated except that manganous acetate was used at the concentration of 0.050 instead of 0.005 mole per liter. Active oxygen absorption took place at the beginning of the reaction but then declined so rapidly that no more absorption could be detected after 60 minutes of reaction at 160°C. The molar yield in isophthalic acid was only 22 percent.

This example shows that manganous acetate, although necessary for the reaction as demonstrated in Example III, has a strong inhibiting effect when used in relatively high concentration.

EXAMPLE VII

The operation of Example I was repeated and the resulting isophthalic acid was separated by filtration and washed as already described. The combined filtrate and washings were charged into a rotative evaporator from which acetic acid and water were removed by distillation under moderate vacuum. The residue of this distillation comprised the catalysts and the intermediate oxidation products present in the reaction mixture. To this residue, there was added: (1) the same amount of water as initially charged into the reactor, (2) an amount of fresh m-diethylbenzene corresponding to about half the amount initially charged, and (3) acetic acid to make up the initial volume. The resulting mixture was then charged into the reactor and reacted exactly in the same conditions as in Example I. The reaction mixture from this second oxidation run was treated as described hereabove and to the distillation residue obtained therefrom were added the same amounts of water, fresh m-diethylbenzene and acetic acid as above. The resulting mixture was then reacted in a third oxidation run which was followed by six other identical runs. The yield in isophthalic acid based on the m-diethylbenzene charged in each run displayed some variations in the first operation as a result of an equilibration phenomenon and then remained practically constant as illustrated in the following table.

TABLE I

| Run No. | Isophthalic Acid Molar Yield (1) | Acid Number | Intermediate Oxidation Products (2) |
|---|---|---|---|
| 1 | 45 | 671 | 142 |
| 6 | 96 | 671 | 156 |
| 7 | 93 | 673 | 166 |
| 8 | 95 | 672 | 185 |
| 9 | 95 | 672 | 163 |

(1) In %, based on the m-diethylbenzene charged in each run
(2) In g per liter of reaction mixture (approximate amount)

This example shows that by recycling the intermediate oxidation products together with fresh hydrocarbon, the overall yield for the conversion of m-diethylbenzene, into isophthalic acid can be as high as 95 percent in the conditions of the present process. Moreover, as shown in Table I, the amount of these intermediates remains practically constant which indicates that no significant accumulation of by-products takes place in the conditions used. This example also shows that the catalysts may be repeatedly recycled into the reaction zone without losing any activity.

EXAMPLE VIII

A series of eleven oxidation runs was performed by the same procedure as described in Example VII and in the same conditions except that anhydrous acetic acid was used as solvent. The yield in isophthalic acid based on the m-diethylbenzene charged in each run climbed progressively from 33 percent to about 89 percent while the amount of intermediate oxidation products present in the system increased from 215 to 395 g per liter of reaction mixture, indicating a definite accumulation of hardly oxidizable products. These were identified as being mainly the acetic ester of m-(1-hydroxyethyl) benzoic acid.

After the eleventh run, the series was continued while adding water to the reaction mixture in the same amount as in Example VII, i.e., 20 percent by volume. As a result of this modification, the yield in isophthalic acid increased and the amount of intermediates decreased as illustrated in Table II.

TABLE II

| Run No. | Isophthalic Acid Molar Yield (%) | Weight of Intermediates (g per liter) |
|---|---|---|
| 1 | 33 | 215 |
| 2 | 74 | 277 |
| 4 | 84 | 313 |
| 6 | 88 | 347 |
| 8 | 87 | 366 |
| 9 | 88 | 376 |
| 10 | 92 | 391 |
| 11 | 89 | 395 |
| Water addition to 20 vol % | | |
| 12 | 127 | 309 |
| 13 | 121 | 251 |
| 14 | 107 | 224 |
| 15 | 99 | 221 |
| 16 | 95 | 221 |
| 17 | 95 | 204 |

From these data, it is clear that, in the absence of water, esters accumulated so that the average yield in isophthalic acid remained below the 90 percent level. As water was added to the system, these esters were readily oxidized into isophthalic acid the yield in which climbed well above 100 percent. As the series was continued with water addition, the yield in isophthalic acid and the amount of intermediates stabilized at about the same level as in Example VII.

This example clearly demonstrates that the promoting action of water already illustrated in Examples II and V is to hydrolyze hardly oxidizable esters thus allowing the further transformation thereof into the desired carboxylic acid.

With the particular procedure of this example, these esters accumulated in the system at the expense of the solvent. In a commercial process where solvent is recycled, this accumulation would result in a continuous increase of the volume of reaction mixture if esters were not removed continuously. Thus, working in anhydrous conditions would result not only in a lower yield in the desired product but also in additional processing costs for removing undesired esters.

EXAMPLE IX

A series of ten oxidation runs was performed in the same conditions as in Example VII except that the initial water content of the reaction mixtures was fixed to only 5 percent by volume instead of 20 percent and the concentration of cobaltous acetate to 0.005 instead of 0.050 mole per liter. After stabilization, the molar yield in isophthalic acid per run was 85 percent instead of 95 percent as in Example VII.

EXAMPLE X

A series of thirteen oxidation runs was performed in the same conditions as in Example VII except that the concentration of cobaltous acetate was 0.005 mole per liter as in the preceding example. The molar yield in isophthalic acid was 86 percent, thus not significantly improved over the yield obtained in the preceding example.

This result demonstrates that the conjoint use of large amounts of water and of the cobalt catalyst is required for obtaining optimum yield in isophthalic acid from m-diethylbenzene.

EXAMPLE XI

Into a reactor as described in Example I but further equipped with means for injecting and withdrawing continuously liquids there was charged:

```
m-diethylbenzene 99%:                    11.4 parts by volume
intermediate oxidation products (from a preceding
 oxidation                               17.3 parts
water:                                   20.0 parts
acetic acid:                             51.3 parts
cobaltous acetate to a final concentration of
                                         0.050 mole per liter
manganous acetate to a final concentration of
                                         0.005 mole per liter
```

The same mixture was pumped continuously into the reactor at such a rate that its residence time was 30 minutes, the volume of liquid in the reactor being maintained constant by withdrawing liquid in excess through a control valve. Simultaneously, air was admitted into the reactor at the same flow rate as in Example I and the reactor content was heated up to 165°C. The reaction was followed by measuring continuously the oxygen content of the vent gas with an oxygen analyzer. After important variations in the beginning of the operation, this oxygen content remained constant, showing that the reaction had reached the steady state. The operation was then continued for one hour while collecting the reaction mixture in a separate vessel for subsequent analysis.

Isophthalic acid present in the reaction mixture thus collected was filtered and washed as described in Example I and the combined filtrate and washings were treated as described in Example VII. The products present in the residue from this treatment were then determined by a vapor-phase chromatography method. The intermediate oxidation products present in the starting mixture were determined similarly. The balance thus established between the components of the starting and final mixtures is shown in the following table.

TABLE III

| Components | IN | OUT | Difference |
|---|---|---|---|
| | moles per 1. of mixture | | |
| m-Diethylbenzene | 0.724 | 0.186 | − 0.542 |
| Intermediates | 1.006 | 1.036 | + 0.030 |
| Isophthalic Acid | — | 0.528 | + 0.528 |
| Total | 1.730 | 1.750 | + 0.020 |

It is seen that the amount of products in the reaction mixture agrees closely, within experimental errors, with the amount of starting materials. This result demonstrates that no significant overoxidation took place during the reaction and, consequently, that in the conditions used the yield in isophthalic acid was close to theoretical. As also shown in the table, these conditions were such that the amount of intermediate oxidation products in the reaction mixture and in the feed were almost identical as it is the case when those intermediates are continuously recycled into the reaction zone.

EXAMPLE XII

Into a reactor equipped as described in Example I, there was charged:

```
ethylbenzene 95%:                5 parts by volume
water:                           2 parts
acetic acid:                     3 parts
cobaltous acetate to a final concentration of
                                 0.050 mole per liter
manganous acetate to a final concentration of
                                 0.005 mole per liter
```

This mixture was reacted for 180 minutes in the same conditions of temperature, air flow rate and pressure as in Example I. After cooling, the reaction mixture was transferred into a rotative evaporator from which most of the solvent was removed by distillation under moderate vacuum. The residue from this distillation was neutralized with aqueous alkali and the resulting solution was extracted with n-pentane to remove intermediate oxidation products. The alkaline solution was then acidified with hydrogen chloride thereby a precipitate was obtained. This precipitate was filtered, washed with water and dissolved in ether. The combined filtrate and washings were extracted with ether and the extract was washed with water. The ether solutions were combined and dried over anhydrous sodium carbonate. Ether was then evaporated to dryness. The residual white solid thus obtained had an acid number of 461 which agrees closely, within experimental errors, with the 459 value for pure benzoic acid and its weight corresponded to a molar yield in benzoic acid of 76 percent based on the ethylbenzene charged.

EXAMPLE XIII

The operation of Example I was repeated except that 98 percent p-diethylbenzene was substituted for m-diethylbenzene. Terephthalic acid was obtained in similar yield and purity.

EXAMPLE XIV

The operation of Example IV was repeated with a mixture of diethylbenzene isomers of the following composition: O-, 28%; m-, 1%: p-, 71%. After reaction, the precipitate present in the mixture was filtered, washed successively with acetic acid, water and acetone, and then it was dried under vacuum. The resulting white solid was identified by infra-red spectroscopy as being pure terephthalic acid and its weight corresponded to a molar yield in terephthalic acid of 48 percent, based on the p-diethylbenzene charged.

This example shows that p-diethylbenzene may be oxidized in admixture with isomers, including o-diethylbenzene.

EXAMPLE XV 1,3,5-Triethylbenzene (93 percent) was oxidized in conditions similar to those described in Example I. After 240 minutes of reaction, the mixture was cooled to 80°C. The precipitate present therein was filtered, washed with acetic acid at the same temperature, then with water, and then it was dried under vacuum. The resulting white solid had an acid number of 796, i.e., close to the 801 value for pure trimesic acid and its weight corresponded to a molar yield in trimesic acid of 46 percent, based on the 1,3,5-triethylbenzene charged.

What is claimed is:

1. A process for the production of benzene carboxylic acids, which comprises reacting ethyl-substituted benzene compounds having the general formula

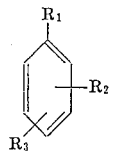

where $R_1$ is an ethyl radical, $R_2$ and $R_3$ are each a member of the group comprising hydrogen and ethyl, acetyl, 1-hydroxyethyl, 1-acetoxyethyl and carboxyl radicals, said radicals being spaced apart from at least one unsubstituted nuclear carbon atom, with molecular oxygen at a temperature between 120° and 200°C in a solvent mixture consisting of acetic acid and water in a volume ratio of between 1:1 and 5:1, acid to water, the amount of said solvent mixture employed being such that at least 10 percent of the reaction mixture is water, and wherein the volume ratio of said solvent mixture to said ethyl-substituted benzene compound is between 1:1 and 10:1 in the presence of a catalyst mixture consisting essentially of a cobalt carboxylate, said cobalt carboxylate present in an amount of 0.010 to 0.100 mole per liter of reaction mixture, and a manganese carboxylate, said manganese carboxylate present in an amount of 0.001 to 0.010 mole per liter of reaction mixture, said carboxylates being soluble in the reaction mixture, and maintaining the concentration of unreacted ethyl-substituted benzene compound in the reaction mixture at a value of at least 5 percent by volume on a solvent-free basis.

2. The process of claim 1 wherein the partial pressure of molecular oxygen is between 0.1 and 10 atm.

3. The process of claim 1 wherein said cobalt and manganese carboxylates are cobalt and manganese acetates.

4. The process of claim 1 wherein said ethylsubstituted benzene compound is m-diethylbenzene and the product is isophthalic acid.

5. The process of claim 1 wherein said ethylsubstituted benzene compounds are a mixture comprising o- and p-diethylbenzenes and said product is terephtalic acid.

6. The process of claim 1 wherein trimesic acid is produced from 1,3,5-triethylbenzene.

7. The process as defined by claim 1, wherein the reaction is carried out in the absence of an activator.

* * * * *

UNITED STATES PATENT OFFICE
CERTIFICATE OF CORRECTION

PATENT NO. : 3,852,343
DATED : December 3, 1974
INVENTOR(S) : JACQUES D. V. HANOTIER and PIERRE M.J.G. DeRADZITZKY It is certified that error appears in the above-identified patent and that said Letters Patent are hereby corrected as shown below:

In the Title, correct the spelling of "BENZENES".

After "[21] Appl. No.: 374,792" please insert

-- [30] FOREIGN APPLICATION PRIORITY DATA

July 22, 1970 Great Britain...35577/70 --.

Signed and Sealed this twenty-third Day of March 1976

[SEAL]

Attest:

RUTH C. MASON
*Attesting Officer*

C. MARSHALL DANN
*Commissioner of Patents and Trademarks*